Patented Apr. 24, 1945

2,374,617

UNITED STATES PATENT OFFICE 2,374,617

MANUFACTURE OF WAXLIKE COMPOSITIONS

David E. Pearsall, Avon, Conn., assignor to The Ensign-Bickford Company, Simsbury, Conn., a corporation of Connecticut No Drawing. Application February 8, 1943, Serial No. 475,184

17 Claims. (Cl. 106—229)

A chief object of this invention is the production of hard wax-like compositions of matter having a range of properties that make them suitable for many purposes. One of the more specific objects of the invention is the production of hard, high melting point waxes or wax-like materials entirely from synthetic constituents which are produced domestically. Such waxes are suitable for electrical insulations, phonograph records, polishes, paper and textile sizing agents, hardening agents, leather dressings, can linings, paper and fiber box coatings, adhesives, etc. Another object of my invention is the production of montan wax substitutes. Montan wax is a high melting point native mineral wax or wax-like material which is produced by solvent extraction from certain lignites. The properties of the waxes vary according to the districts in which the lignites are found. The montan wax industry is almost entirely a foreign one and prior to the present war most of the wax was imported from Saxony. Some wax, though of a poorer quality, is also produced from Irish lignite. Montan wax may be extracted from some of the lignites present in certain western and mid-western sections of the United States such as the North Dakota and Texas lignite; but the waxes so produced are lacking in certain desirable qualities and no domestic montan wax industry has developed. While the montan waxes from the varying sources may have considerably different compositions, nevertheless they all invariably contain free montanic acid and esters of this acid.

For many purposes montan wax is bleached prior to use as its dark color is objectionable. The compositions of my invention, may be almost colorless as formed or may be dyed any color or may be shaded to any degree of blackness. Furthermore, natural montan wax is in many cases esterified with glycerine to produce a more satisfactory product. The waxes of this invention have as a major component ester gums, which are esterified rosins or esters of other organic acids, and which may impart to the compositions properties similar to esterified montan waxes. Thus the compositions of matter herein described are not only montan wax substitutes but are in addition substitutes for the esters of montan wax and for its modifications—montan wax and its esters and modifications being herein generically identified as montan wax products. Thus the properties of my new compositions may vary over a desirably wide range; the differences in the properties result from varying the proportions of the major ingredients of the composition and from the addition of certain minor ingredients.

The constituents of the improved products are materials manufactured and readily available in the United States, and since they are of the nature of synthetic materials, of definite and substantially uniform compositions, the new products made from them, under controlled conditions, are extremely uniform in composition and one lot can be duplicated exactly with succeeding lots.

More specifically, my discovery is that by fusing together, at elevated temperatures and in suitable proportions, a material such as hydrogenated castor oil and a substance such as ester gum, the resulting products are wax-like thermoplastic materials having, to at least a high degree, the desirable properties of montan wax products. It is at present preferred to employ a hydrogenated castor oil which has been hydrogenated so that it has a melting range of about 185° to 190° F., and to use an ester gum which has a softening range of about 185° to 205° F., but it will be understood that hydrogenated castor oils and ester gums of other melting or softening ranges can be used, while retaining many advantages of the invention.

In some cases, I have found that the addition of certain other or additional ingredients, conveniently in minor quantities, improves the composition for various purposes. For instance, if there is added to a mixture of hydrogenated castor oil and ester gum, certain amounts of high melting point (160° F. or above) amorphous or micro-crystalline petroleum wax (such as petrolatum stock wax as identified in United States Patent No. 1,968,907, issued August 7, 1934) the result is to reduce the hot viscosity of the mix, e. g. its viscosity at temperatures of about 200 to 220° F. Moreover, the inclusion of the petrolatum wax is found to lessen the drying or hardening time. It has been found that petroleum asphalts, say of about 180° F. softening point, if added in small amounts, also improve the properties of the product by enhancing its consistency or toughness, and improving its color. The addition, likewise in minor proportions, of high softening point residues obtained in the production of wood rosin will increase the hardness of my new compositions and lower the hot viscosity. This material may be described as a gasoline-insoluble resin obtained, for example, from pine wood by extraction of comminuted pine wood by a coal tar hydrocarbon, removal of the volatile substances from such extract to produce a mixture of solid resins, extracting such solid resin mixture by a volatile paraffin hydrocarbon to remove rosin from said resin mixture, and recovering a paraffin hydrocarbon-insoluble resin substantially free from rosin. Examples of such residue materials are the products known by the trade names "Vinsol" and "Belro" resin, sold by Hercules Powder Co.

Although I have named a few products which when used in minor amounts will somewhat modify the properties of the new compositions, e. g. as by improving one or another of their characteristics, it will now be readily apparent to one skilled in the art that the addition of any of a wide variety of other natural and synthetic resins, waxes and the like, for instance in similar minor quantities will also modify the properties of the compositions, and it is therefore to be understood that the use of such materials comes within the scope of my invention, in its broader aspects. For example, the petrolatum wax mentioned above could be replaced by paraffin, and the asphalt by modified synthetic resins of various types. It is of special advantage, however, and I therefore greatly prefer, to employ as substitute minor ingredients, only those products which are synthetic, in contradistinction to raw materials.

Although other methods may be employed, a presently preferred procedure for making the new wax composition, is to melt first the ester gum, together with the materials other than the hydrogenated castor oil (if any such other materials are employed), and stir together in a suitably heated vessel, until a uniform mass is produced. The hydrogenated castor oil is then added and the resulting mix again stirred until it is entirely uniform and homogeneous. It is recommended that the temperature be kept below about 220° F. (except when a material such as a rosin residue, e. g. "Vinsol," is present, requiring somewhat higher temperature) during the mixing operation and indeed for continuance of the material in molten condition, or for re-melting—i. e. during application of the product—it is usually desirable to keep the temperature below about 210° F. Although higher temperatures may be employed in some cases, it will be appreciated that the stated temperatures are below those commonly used for montan wax and thus the new product is of particular advantage in having a lower application temperature.

By way of specific example, the following will serve to illustrate the manufacture of one type of composition embodying the invention: A wax mix was made according to the preferred procedure set forth above, with the ingredients of the character described and in the following proportions (by weight):

| | Per cent |
|---|---|
| Hydrogenated castor oil | 50 |
| Ester gum | 40 |
| Petroleum wax | 8 |
| Asphalt | 2 |
| | 100 |

Examination and test of the resulting product demonstrated that its properties were generally similar to those of certain montan waxes. The comparison is more specifically set forth in the following table (wherein the above example of a product of the present invention is identified as montan wax "substitute"), of certain important characteristics of an imported wax and of a composition embodying my invention.

| Properties | Montan wax | Montan wax substitute |
|---|---|---|
| Color | Dark brown | Medium brown. |
| Fracture | Conchoidal | Conchoidal. |
| Lustre | Waxy | Waxy. |
| Streak on porcelain | Brown | Brown. |
| Melting point | 170°–200° F | 183°–190° F. |
| Hardness | Very hard | Almost as hard as montan. |
| Acid value | 28–33 | Less than 5. |
| Saponification value | 50–95 | Approx. 100. |
| Asphaltic constituents | 0 | 2%. |
| Resins constituents | 20–30% | 40%. |
| Wax-like constituents | 49–52½% | 58%. |
| Sulfur containing acids | 6½–8% | 0. |
| Oxy acids and alcohols | 8–25% | 0. |
| Apparent sp. g. (20° C.) | 0.9–1.00 | 1.0–1.03. |
| Drying time in film (sec.) | 20–30 | 20–30. |
| Application temperature | Not over 230° F | Not over 210° F. |
| Solubility | Soluble in petroleum hydrocarbons, soluble in coal tar hydrocarbons. | Soluble in petroleum hydrocarbons, soluble in coal tar hydrocarbons. |

It will be noted that among the desirable properties of my new wax are its high melting point, hardness, inertness, polishing qualities, insulating qualities, and resistance to moisture and water. In all of these respects, the material appears as good as, or better than, the imported product.

It will be appreciated that the proportions of the ingredients may be considerably varied, while retaining the improved properties of the new composition in substantial measure. Thus for example the relative amounts of hydrogenated castor oil and ester gum, may be considerably varied, as from a mixture of about 25 parts of hydrogenated castor oil with about 75 parts of ester gum, to a composition containing about 85 parts of hydrogenated castor oil with about 15 parts of ester gum; for approximation, however, of actual identities with montan waxes, the quantity of each of the principal ingredients, viz. hydrogenated castor oil and ester gum, should be kept within the relatively critical range of about 30% to 60% of the complete mix—the hydrogenated castor oil preferably constituting at least about 50% of the whole. The additional materials, if employed, are usually added in minor quantities; for instance, petrolatum wax or petroleum asphalt may be included in an amount advantageously not greater than about 30% of the final mixture. Very preferably, however, the amount of the petrolatum wax, if used, should constitute about 5% to 15% of the total, and the quantity of the asphalt, if any, should lie within the range of about 1% to 5%. Material such as "Vinsol" or "Belro" resin, if used, should ordinarily not constitute more than about 10% of the mix, and is preferably used in quantities of about 2 to 7% of the total mix.

It is to be understood that the invention is not limited to the procedures and compositions hereing illustratively disclosed, but may be carried out in other ways and by the use of equivalents, without departure from its spirit.

I claim:

1. A hard, high melting point, wax-type composition comprising hydrogenated castor oil having a melting range of about 185° to 190° F. and constituting at least about 50% of the composition, and ester gum having a softening range of about 185° to 205° F. and constituting in excess of about 30% of the composition, the whole being homogeneously fused and combined to provide properties of a hard, wax-like character.

2. The composition of claim 1 which includes a minor quantity of high melting point microcrystalline mineral type wax, said composition being characterized by a low viscosity in hot, molten condition.

3. The composition of claim 1 which includes a minor quantity of a coal-tar solvent-soluble and gasoline-insoluble resin remaining after solvent refining of wood rosin, said composition being characterized by a low viscosity in hot, molten condition.

4. The composition of claim 1 which includes a minor quantity of petroleum asphalt having a softening point of about 180° F. homogeneously incorporated and providing properties of toughness and durability.

5. A hard, high melting point wax-type composition comprising hydrogenated castor oil having a melting range of about 185° to 190° F. and constituting at least about 50% of the composition, and ester gum having a softening range of about 185° to 205° F. and constituting in excess of about 30% of the composition, the whole being homogeneously fused and combined to provide properties of a hard, wax-like character, said composition including minor quantities of petroleum asphalt having a softening point of about 180° F., high melting point petroleum wax and a coal-tar solvent-soluble and gasoline-insoluble resin remaining after solvent refining of wood rosin.

6. A hard, high melting point, quick-drying, wax-type composition consisting of hydrogenated castor oil having a melting range of about 185° to 190° F. and constituting at least about 50% of the composition, ester gum having a softening range of about 185° to 205° F. and constituting in excess of about 30% of the composition, and minor quantities of petrolatum wax and high softening point petroleum asphalt, the whole being homogeneously fused and combined to provide properties of a hard, tough, wax-like character.

7. A hard, moisture-resisting, high melting point wax-type composition comprising a fused homogeneous mixture of hydrogenated castor oil and ester gum, including hydrogenated castor oil amounting to about 25 to 85% of the mixture and ester gum amounting to about 15 to 75% of the mixture.

8. A hard, moisture-resisting, high melting point wax-type composition comprising the following ingredients in approximately the following amounts, homogeneously fused and combined to provide properties of a hard, wax-like character:

| | Per cent |
|---|---|
| Hydrogenated castor oil | 30 to 60 |
| Ester gum | 30 to 60 |
| Petrolatum wax | 5 to 30 |

9. A hard, moisture-resisting, high melting point wax-type composition comprising the following ingredients in approximately the following amounts, homogeneously fused and combined to provide properties of a hard, wax-like character:

| | Per cent |
|---|---|
| Hydrogenated castor oil | 30 to 60 |
| Ester gum | 30 to 60 |
| Petroleum asphalt | 2 to 30 |

10. A hard, moisture-resisting, high melting point wax-type composition comprising the following ingredients in approximately the following amounts, homogeneously fused and combined to provide properties of a hard, wax-like character:

| | Per cent |
|---|---|
| Hydrogenated castor oil | 30 to 60 |
| Ester gum | 30 to 60 |
| A coal-tar solvent-soluble and gasoline-insoluble resin remaining after solvent refining of wood rosin | 2 to 10 |

11. A hard, moisture-resisting, high melting point, fused, homogeneous wax-type composition composed of:

| | Per cent |
|---|---|
| Hydrogenated castor oil | 30 to 60 |
| Ester gum | 30 to 60 |
| Petrolatum wax | 5 to 25 |
| Petroleum asphalt | 2 to 25 |

12. A hard, moisture-resisting, high melting point, fused, homogeneous wax-type composition composed of:

| | Per cent |
|---|---|
| Hydrogenated castor oil | 30 to 60 |
| Ester gum | 30 to 60 |
| Petrolatum wax | 5 to 15 |
| Petroleum asphalt | 1 to 5 |

13. A hard, moisture-resisting, high melting point, fused, homogeneous wax-type composition composed of:

| | Per cent |
|---|---|
| Hydrogenated castor oil | 30 to 60 |
| Ester gum | 30 to 60 |
| A coal-tar solvent-soluble and gasoline-insoluble resin remaining after solvent refining of wood rosin | 2 to 7 |
| Petroleum asphalt | 1 to 5 |

14. A wax-type composition comprising a fused, homogeneous mixture of the following ingredients in about the following proportions:

| | Per cent |
|---|---|
| Hydrogenated castor oil | 50 |
| Ester gum | 40 |
| Petrolatum wax | 8 |
| Petroleum asphalt | 2 |

15. A hard, moisture-resisting, high melting point wax-type composition comprising a homogeneous mixture of high melting point thermoplastic ingredients, including hydrogenated castor oil and ester gum each in an amount not less than about 40% of the mixture, said ingredients being fused and combined to provide properties of a hard, wax-like character.

16. A hard, moisture-resisting, high melting point wax-type composition comprising a fused, homogeneous mixture of high melting point thermoplastic ingredients, including hydrogenated castor oil amounting to at least about 50% of the mixture and ester gum amounting to at least about 40% of the mixture.

17. A wax-like composition of matter suitable for use as a montan wax substitute, including substantially the following ingredients in approximately the following proportions:

| | Per cent |
|---|---|
| Hydrogenated castor oil, melting range about 185° to 190° F. | 50 |
| Ester gum, softening range about 185° to 205° F. | 40 |
| Petroleum wax, melting point at least about 160° F. | 8 |
| Petroleum asphalt, softening point about 180° F. | 2 | said composition being further characterized by the following approximate physical and chemical characteristics: color, brown; fracture, conchoidal; lustre, waxy; streak on porcelain, brown; melting point about 183° to 190° F.; hardness, hard; acid value, less than about 5; saponification value, approximately 100; asphaltic constituents, approximately 2%; resins constituents, approximately 40%; wax-like constituents, approximately 58%; sulfur containing acids, substantially zero; oxy acids and alcohols, substantially zero; apparent specific gravity (20° C.), 1.0–1.03; drying time in film, seconds, 20–30; application temperature, not over about 210° F.; solubility, soluble in petroleum hydrocarbons, soluble in coal tar hydrocarbons.

DAVID E. PEARSALL.